(12) United States Patent
Westlund et al.

(10) Patent No.: US 10,005,474 B2
(45) Date of Patent: Jun. 26, 2018

(54) VEHICLE SYSTEM, VEHICLE COMPRISING A VEHICLE SYSTEM AND METHOD FOR ALLOWING TRANSITION FROM AN AUTONOMOUS DRIVING MODE

(71) Applicant: VOLVO CAR CORPORATION, Gothenburg (SE)

(72) Inventors: Mathias Westlund, Lerum (SE); Jonas Nilsson, Molndal (SE)

(73) Assignee: Volvo Car Corporation, Gothenburg (SE)

( * ) Notice: Subject to any disclaimer, the term of this patent is extended or adjusted under 35 U.S.C. 154(b) by 0 days. days.

(21) Appl. No.: 15/140,596

(22) Filed: Apr. 28, 2016

(65) Prior Publication Data
US 2016/0325757 A1 Nov. 10, 2016

(30) Foreign Application Priority Data
May 5, 2015 (EP) ...................... 15166330

(51) Int. Cl.
*B60W 50/08* (2012.01)
*B62D 1/28* (2006.01)
(Continued)

(52) U.S. Cl.
CPC ........... *B60W 50/082* (2013.01); *B62D 1/286* (2013.01); *G05D 1/0061* (2013.01);
(Continued)

(58) Field of Classification Search
CPC ....... B60W 50/082; B60W 2050/0074; B60W 2540/04; B60W 2540/10; B62D 1/286;
(Continued)

(56) References Cited

U.S. PATENT DOCUMENTS 8,825,258 B2 9/2014 Cullinane et al.
2010/0179715 A1* 7/2010 Puddy ............... G05D 1/0061
701/23
(Continued)

FOREIGN PATENT DOCUMENTS

WO 2008072007 6/2008
WO WO2016109765 A1 * 12/2015

OTHER PUBLICATIONS

Extended European Search Report for European Application No. EP 15166330.9, Completed by the European Patent Office, dated Nov. 24, 2015, 5 Pages.

*Primary Examiner* — Anne M Antonucci
*Assistant Examiner* — Renee LaRose
(74) *Attorney, Agent, or Firm* — Brooks Kushman P.C.

(57) ABSTRACT

A vehicle system is arranged for allowing transition from an autonomous driving mode to a second driving mode in a road vehicle having autonomous driving capabilities and including a vehicle compartment, a steering wheel and at least one pedal. The vehicle system includes a control arrangement, a first switch arranged at a first position at the steering wheel, a second switch arranged at a second position within the vehicle compartment, and a first determination arrangement for determining if the at least one pedal is depressed. The control arrangement is configured to allow the transition when the at least one pedal of the vehicle is depressed when the first switch and the second switch are simultaneously activated.

20 Claims, 3 Drawing Sheets

(51) Int. Cl.
*G05D 1/00* (2006.01)
*B60W 50/00* (2006.01)

(52) U.S. Cl.
CPC ...... *G05D 1/0088* (2013.01); *B60K 2350/928* (2013.01); *B60W 2050/0074* (2013.01); *B60W 2540/04* (2013.01); *B60W 2540/10* (2013.01); *G05D 2201/0213* (2013.01)

(58) Field of Classification Search
CPC .............. G05D 1/0061; G05D 1/0088; G05D 2201/0213; B60K 2350/928
USPC .......................................................... 701/23
See application file for complete search history.

(56) References Cited

U.S. PATENT DOCUMENTS

| | | |
|---|---|---|
| 2013/0002416 A1 | 1/2013 | Gazit |
| 2014/0081521 A1* | 3/2014 | Frojdh .............. H04M 1/72583 701/36 |
| 2014/0262705 A1* | 9/2014 | Srbinovski ............ B60R 16/005 200/61.54 |
| 2015/0239470 A1* | 8/2015 | Rindfleisch ........... B60W 10/06 701/110 |
| 2016/0023652 A1* | 1/2016 | Soo ........................ B60W 20/20 701/22 |
| 2016/0152137 A1* | 6/2016 | Sunahiro ................ F16H 63/18 180/364 |
| 2016/0265654 A1* | 9/2016 | Jerger ................. F16H 59/0204 |

\* cited by examiner

VEHICLE SYSTEM, VEHICLE COMPRISING A VEHICLE SYSTEM AND METHOD FOR ALLOWING TRANSITION FROM AN AUTONOMOUS DRIVING MODE

CROSS-REFERENCE TO RELATED APPLICATIONS

This application claims foreign priority benefits under 35 U.S.C. § 119(a)-(d) to European patent application number EP 15166330.9, filed May 5, 2015, which is incorporated by reference in its entirety.

TECHNICAL FIELD

Embodiments herein relate to a vehicle system for allowing transition from an autonomous driving mode to a second driving mode in a road vehicle. Embodiments herein further relate to a road vehicle comprising a vehicle system for allowing transition from an autonomous driving mode to a second driving mode in the vehicle and to a method for allowing transition from an autonomous driving mode to a second driving mode in a road vehicle.

BACKGROUND

Vehicles today may have different driving modes with different levels of activated arrangements and systems for relieving a vehicle operator from some or all operations he/she otherwise would have had to perform in order to drive the vehicle along a route.

A driving mode in which the vehicle operator himself/herself drives the vehicle along a route or road is referred to as a manual driving mode. In the manual driving mode the vehicle operator provides e.g. steering-, accelerating- and braking input to the vehicle.

Many vehicles provide some semi-autonomous functionality. For example, vehicles equipped with automatic or adaptive cruise control can control the host vehicle to keep a distance to a preceding vehicle such that e.g. rear-end collisions are avoided or mitigated. A lane keeping aid in a vehicle may control a lateral position of the host vehicle such that the vehicle follows a road lane, alternatively the aid can warn the operator when a road lane is crossed. When such system or systems are activated, a vehicle operator is relieved from the some tasks but has to continuously stay alert and be ready to manually interact and take over if necessary. Such a driving mode is referred to as a semi-autonomously driving mode.

Some vehicles today are capable of driving autonomously, i.e. without steering- accelerating- or braking input from a vehicle operator. Sensors of the autonomous vehicle continuously monitor the vehicle surrounding. The sensors can detect e.g. road lanes, surrounding traffic and various obstacles on- or in the vicinity of the road. The sensors may detect distance and direction to other vehicles, pedestrians, bicycles etc. Different kinds of sensors may be used, such as cameras, radar and/or lidar. Autonomous vehicles can also comprise communication equipment, such that road and/or traffic information may be sent to the vehicle. A drive arrangement of the vehicle can then control drive functions, such as steering, accelerating, braking etc. as a function of the information received from the sensors and information sent to the vehicle. Hereby the vehicle can drive autonomously along at least some road sections within a road network. A driving mode in which the vehicle is driving autonomously is referred to as an autonomous driving mode.

Autonomous drive functions may facilitate for a vehicle operator, since he/she may focus on secondary tasks instead of driving when autonomous driving is enabled. However, due to limitations of host vehicle functions or due to preferences from the vehicle operator, he/she may select to drive manually instead of using the autonomous drive mode.

Some requirements should be met before transitions between the different driving modes should be possible to initiate. For example, autonomous driving may be enabled only when the sensors provide the drive arrangement with sufficient information on the host vehicle surrounding. During a transition from an autonomous driving mode to a manual or semi-autonomous driving mode some other requirements may have to be met. It is desirable that it is clear to the vehicle operator when transitions are made, such that he/she knows which driving mode is being utilized at a certain moment. It is also desirable that transitions between the different driving modes are made in a smooth and secure manner. Thus, improvements related to transitions between different driving modes are desirable.

SUMMARY

Embodiments herein aim to provide a vehicle system for allowing transition from an autonomous driving mode to a second driving mode in a road vehicle in a safe and efficient manner.

According to an embodiment, this is provided by a vehicle system for allowing transition from an autonomous driving mode to a second driving mode in a road vehicle having autonomous driving capabilities and comprising a vehicle compartment, a steering wheel and at least one pedal, wherein the vehicle system comprises: a control arrangement, a first switch arranged at a first position at the steering wheel, a second switch arranged at a second position within the vehicle compartment, the second position being separate from the first position and a first determination arrangement for determining if the at least one pedal is depressed. The control arrangement is configured to allow the transition when it is determined that at least one pedal of the vehicle is depressed when the first switch and the second switch are simultaneously activated.

Since the control arrangement is configured to allow the transition when it is determined that at least one pedal of the vehicle is depressed when the first switch and the second switch are simultaneously activated, a risk that the autonomous driving mode is unintentionally disabled is eliminated or at least considerably decreased.

Further, since the first switch is arranged at the steering wheel and the transition is allowed only when it is determined that the vehicle operator has a foot on a pedal, it is ensured that the vehicle operator is positioned in a position from where he/she safely can take over control and responsibility for the driving. He/she thus have to have at least one hand at the steering wheel and one feet at a pedal before the transition can take place. In addition, he/she also needs to activate the second switch before the transition is allowed. Hereby it is ensured that the vehicle operator is fully aware that autonomous driving is disabled and a second driving mode is enabled.

Thus, hereby is provided a vehicle system for allowing transition from an autonomous driving mode to a second driving mode which both render clear the driving responsibility and avoids unintentional transition from an autonomous driving mode. Due to this both safety and comfort is increased.

According to some embodiments, the control arrangement comprises a switch activation determination unit and is configured to allow the transition when it is determined that the first switch and the second switch are simultaneously activated for at least a threshold amount of time. Since the vehicle operator needs to activate the first switch and the second switch simultaneously for at least a threshold amount of time and depress at least one pedal before the transition from the autonomous driving mode can take place, it is even more ensured that he/she is aware of the disablement of the autonomous driving mode. Safety is hereby further enhanced. The at least one pedal can be depressed at any time after activation of the first and second switch. Thus, the vehicle operator can activate the first switch and the second switch simultaneously for at least a threshold amount of time and then depress at least one pedal. The vehicle operator can also depress the at least one pedal from the moment the first and second switches are simultaneously activated until one or both of the switches are de-activated for allowing the transition from the autonomous driving mode.

With a threshold amount of time also the robustness of the system is increased since glitches or minor electrical faults will not be interpreted as a vehicle operator intention to initiate a transition between driving modes.

According to some embodiments, the second driving mode is a semi-autonomous driving mode. Hereby the vehicle operator can initiate the transition from the autonomous driving mode to the semi-autonomous driving mode in a manner that render it very clear to him/her that he/she now has the responsibility for at least some of the driving tasks and that the vehicle no longer drives autonomously. This provides for safer transitions between the different driving modes.

According to some embodiments, the second driving mode is a manual driving mode.

Since the second driving mode is a manual driving mode, a risk that the vehicle operator disables the autonomous driving mode without being fully aware of his/her responsibility for the driving operations is eliminated. In this embodiment it is avoided that the vehicle operator switches from autonomous driving to semi-autonomous driving and is confused of which driving tasks he/she still has to perform. It is further ensured that he/she is not surprised of his/her responsibility if some semi-autonomous functions eventually are disabled.

According to some embodiments, the first switch is arranged at a first half of a steering wheel circumference and the second switch is arranged at a second half of the steering wheel circumference. Hereby it is ensured that the driver has both his/her hands in a position suitable for operating the vehicle. The first and second switches may be arranged so the vehicle operator have to have his/her hands in a "ten-to-two-a clock" position or similar.

According to some embodiments, the first switch and the second switch are arranged at a first side of the steering wheel, facing away from a steering column. Hereby the vehicle operator can see the switches and easily activate them with his fingers.

According to some embodiments, the first switch and the second switch are arranged at a second side of the steering wheel, facing a steering wheel column. Hereby the vehicle operator easily and intuitively is allowed to activate the switches by gripping the steering wheel with both hands.

According to some embodiments, the first switch is a lever-switch arranged at the steering wheel and according to some embodiments, both the first switch and the second switch are lever-switches arranged at the steering wheel.

With one or two dedicated lever switches the vehicle operator can switch between different driving modes in a safe, reliable and conscious manner.

Embodiments herein also aim to provide a vehicle comprising a vehicle system in a safe and efficient manner. According to some embodiments, this is provided by a vehicle comprising a vehicle system according to embodiments disclosed herein.

Embodiments herein also aim to provide a method for allowing transition from an autonomous driving mode to a second driving mode in a safe and efficient manner.

According to some embodiments, this is provided by a method for allowing transition from an autonomous driving mode to a second driving mode in a road vehicle having autonomous driving capabilities and comprising a vehicle compartment, a steering wheel and at least one pedal, wherein the method comprises: allowing, by a control arrangement, the transition when it is determined, by a first determination arrangement, that at least one pedal of the vehicle is depressed when the first switch and the second switch are simultaneously activated.

Since the method includes allowing the transition when it is determined that at least one pedal of the vehicle is depressed when the first switch and the second switch are simultaneously activated, a risk that the autonomous driving mode is unintentionally disabled is eliminated or at least considerably decreased.

BRIEF DESCRIPTION OF THE DRAWINGS

The various embodiments herein, including its particular features and advantages, will be readily understood from the following detailed description and the accompanying drawings, in which.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Embodiments herein will now be described more fully with reference to the accompanying drawings, in which some embodiments are shown. However, this application should not be construed as limited to the embodiments set forth herein. Disclosed features of example embodiments may be combined as readily understood by one of ordinary skill in the art to which this application belongs. Like numbers refer to like elements throughout.

Well-known functions or constructions will not necessarily be described in detail for brevity and/or clarity.

Figure 1:
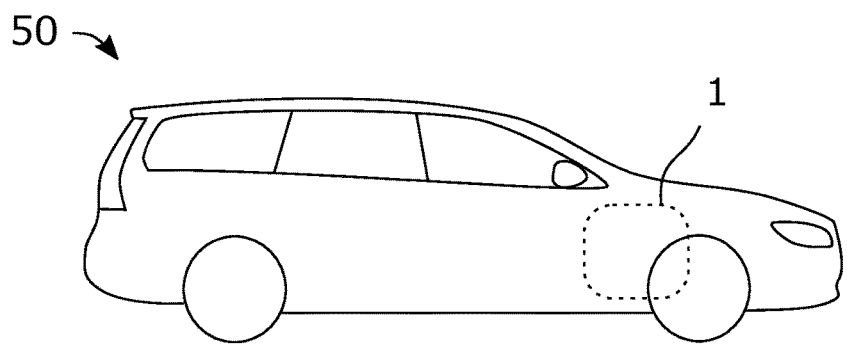
FIG. 1 illustrates a vehicle and a system for transition from an autonomous driving mode to a second driving mode according to some embodiments.

FIG. 1 illustrates a vehicle 50. The vehicle 50 comprises a vehicle system 1 for allowing transition from an autonomous driving mode to a second driving mode. The second driving mode can be a semi-autonomous driving mode or a manual driving mode.

Figure 2:
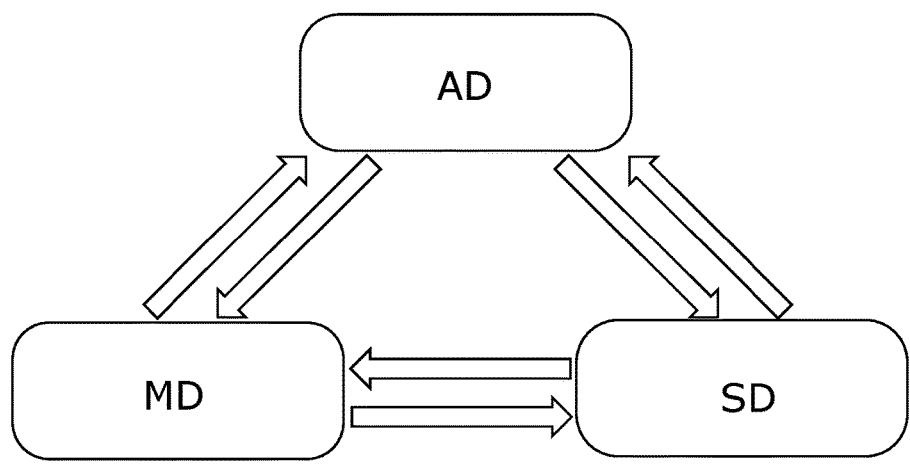
FIG. 2 illustrates different vehicle driving modes according to some embodiments.

The different driving modes are illustrated in FIG. 2. When driving or driven, the host vehicle 50 will be in a particular driving mode selected from a plurality of driving modes. As described above, such driving modes can be an autonomous driving mode AD, a semi-autonomous driving mode SD or a manual driving mode MD. When a first driving mode is disabled, another driving mode will be enabled. This is referred to as a transition from the first driving mode to the other driving mode. Similarly, when a first driving mode is enabled, another driving mode will be disabled. This is referred to as a transition from the other driving mode to the first driving mode.

A vehicle operator can initiate driving mode transition, e.g. when he/she would like to disable manual driving and enable semi-autonomous driving or vice versa. He/she can also initiate driving mode transition, when he/she would like to disable manual driving and enable autonomous driving or vice versa. He/she can further initiate driving mode transition, when he/she would like to disable semi-autonomous driving and enable autonomous driving or vice versa.

Figure 3:
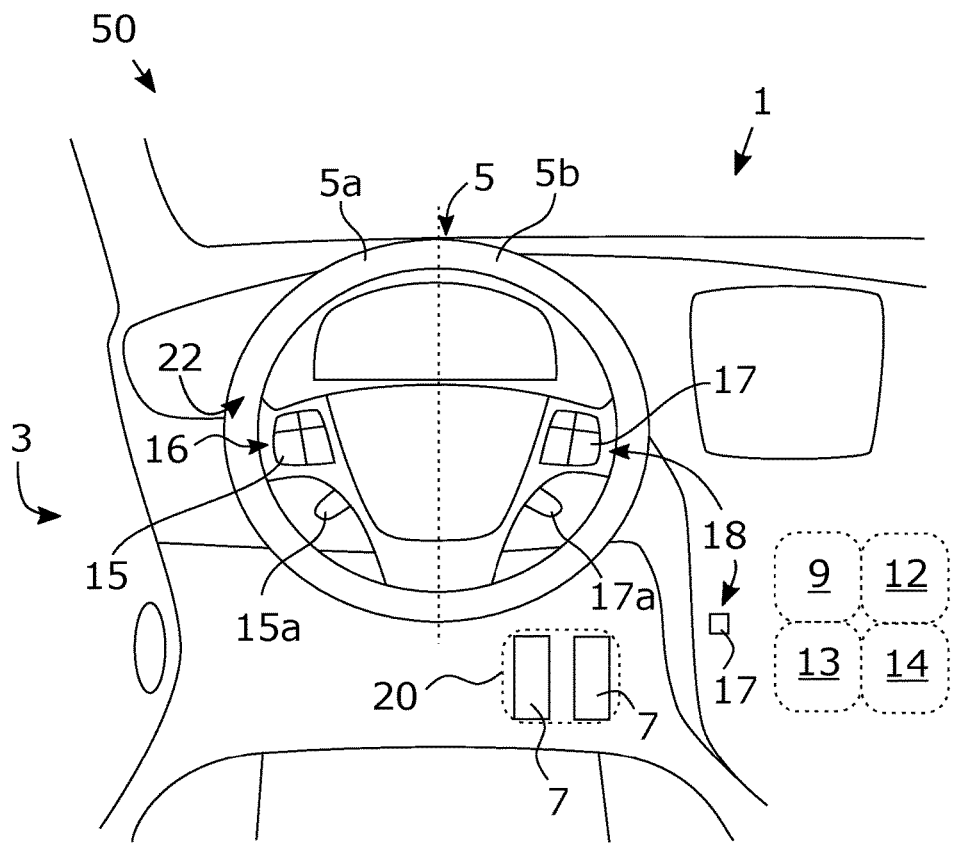
FIG. 3 illustrates a vehicle system according to some embodiments.

The vehicle 50 illustrated in FIG. 3 comprises a vehicle compartment 3, a steering wheel 5 and at least one pedal 7.

The vehicle system 1 comprises a control arrangement 9 which is configured to control which different driving modes a vehicle operator should be able or allowed to enable and disable. The control arrangement 9 is arranged to control which actions the vehicle operator has to perform in order to initiate such a transition and possibly also to allow which of the transitions that should be available for the vehicle operator.

The control arrangement 9 may comprise or be connected to one or more processing units 12 and/or to a drive arrangement 13 of the host vehicle 50. The processing unit 12 may comprise one or more processors (e.g., microprocessors, microcontrollers, programmable digital signal processors, or other programmable devices), and may also, or instead, include an application specific integrated circuit (ASIC), a programmable gate array or programmable array logic, a programmable logic device, or a digital signal processor (DSP). A programmable device such as a microprocessor, microcontroller or programmable digital signal processor, may further include a memory or storage for storing computer executable instructions (e.g., code) that are executable by the programmable device for controlling operation thereof and for performing the particular algorithms represented by the various functions and/or operations described herein.

In some embodiments the one or more processors or processing units 12 may be used for processing in several different vehicle systems. Some processors or processing units 12 may be dedicated to a specific processing task. In some embodiments the host vehicle 50 and/or the control arrangement 9 may comprise a large number of processors or processing units 12. The host vehicle 50 can be controlled to be driven semi-autonomously or fully autonomously by the drive arrangement 13.

In the autonomous driving mode AD, the drive arrangement 13 allows the host vehicle 50 to be driven autonomously along a route or a road. The drive arrangement 13 normally comprises an electrical/mechanical control system, arranged to control steering and velocity of the host vehicle 50 at least partly based on information received from vehicle sensors. The sensors can e.g. be one or more camera sensors, one or more radar sensors and/or one or more lidar-sensors. A camera sensor may be e.g. a front-, side- or rear facing digital camera equipped with or connected to one or more processors with object recognition logics. Hereby surrounding objects, such as road lanes, other vehicles, traffic signs, pedestrians, animals, different obstacles etc. may be detected and in some cases, identified/classified. Radar sensors include transmitters that emit signals that bounce back from objects around the host vehicle, and receivers that receive the returned signals. The radar sensors may include e.g. ultra-wide band radars, narrow band radars and/or multi node radars. Lidar-sensors may measure distances to objects through illuminating the objects with a laser and analyzing the reflected light. Other types of sensors used to monitor the vehicle surrounding may be e.g. ultrasonic sensors and/or infrared sensors. The host vehicle 50 can also comprise communication equipment such that the host vehicle 50 is able to send and receive various kinds of information.

The drive arrangement 13 is connected to a vehicle steering system, such that the drive arrangement 13, directly or indirectly, can control a direction of at least some of the wheels of the host vehicle 50. Hereby e.g. a yaw rate of the host vehicle 50 can be adjusted, such that the driving direction of the host vehicle 50 is adjusted in accordance with the input from the drive arrangement 13. The drive arrangement 13 is also connected to a host vehicle engine and a host vehicle braking system, such that the drive arrangement 13, directly or indirectly, can control acceleration and/or deceleration of the host vehicle 50. The drive arrangement 13 can e.g. increase a host vehicle velocity by increasing the engine speed, and decrease the host vehicle velocity by motor-braking or by activation of one or more wheel brakes. The drive arrangement 13 may e.g. be connected to an ABS (anti-lock braking system), such that one or more wheel brakes can be activated selectively.

In some embodiments the host vehicle 50 comprises a navigation system, to which a user can input a preferred host vehicle route. The navigation system can comprise a positioning system, which may determine a host vehicle position and heading. The positioning system can determine the host vehicle position and driving direction e.g. via a satellite based global positioning system or via map matching and a compass.

In some embodiments the drive arrangement 13 comprises, or is connected to, a number of vehicle subsystems. Each such subsystem may provide some automatic- or semi-autonomous drive functions but cannot autonomously control the host vehicle 50 from a first destination to a second destination without input from a driver. The host vehicle is in a semi-autonomous driving mode SD when the autonomous drive mode is disabled and one or more semi-autonomous systems are activated. Examples of such subsystem are: adaptive cruise control systems, lane departure control systems, collision avoidance systems, traffic sign recognition systems, some communication systems, some navigation systems, ultrasonic sensor systems, infrared camera systems, inertial measuring systems, intelligent transportation systems, safe road train systems, automatic parking systems etc.

To sum up; In the AD-mode the host vehicle 50 and the drive arrangement 13 are responsibility for controlling the vehicle 50. In the SD-mode the vehicle operator is relieved from some tasks but he/she has the responsibility for the vehicle control. When the host vehicle 50 is in the manual driving mode MD the vehicle operator himself/herself is responsible for substantially all driving related aspects of the vehicle 50.

As illustrated in FIG. 3, the vehicle system 1 comprises a first switch 15 arranged at a first position 16 at the steering wheel 5 and a second switch 17 arranged at a second position 18 within the vehicle compartment 3. The second position 18 is separate from the first position 16.

The first switch 15 and/or the second switch 17 can be arranged e.g. as a push-button or mechanical switch of any kind. A vehicle operator has to actively activate and/or press the first switch 15 and/or the second switch 17 in order to enable any functions associated with the first switch 15 and/or the second switch 17. In some embodiment the first switch 15 and/or the second switch 17 can be arranged as a touch button, sliding touch button or a display icon.

The vehicle system 1 also comprises a first determination arrangement 20 for determining if the at least one pedal 7 is depressed. The first determination arrangement 20 can comprise e.g. a sensor or switch of any kind for the determination. For example, a pressure sensor or a electromechanical switch can be used for the determination.

The control arrangement 9 is configured to allow a transition from an autonomous driving mode AD to a second driving mode only when it is determined that at least one pedal 7 of the vehicle 50 is depressed when both the first switch and the second switch already are in an activated state, i.e. pressed, pulled or similar by the vehicle operator. The second driving mode can be a semi-autonomous driving mode SD or a manual driving mode MD.

In the FIG. 3 embodiment the first switch 15 is arranged at a first half 5a of a steering wheel circumference and the second switch 17 is arranged at a second half 5b of the steering wheel circumference. In the FIG. 3 embodiment the first switch 15 and the second switch 17 are arranged at a first side 22 of the steering wheel 5, facing away from a steering column. In other embodiments the first switch 15 and the second switch 17 are arranged at a second side of the steering wheel 5, facing a steering wheel column and thus away from a seated vehicle operator. As illustrated in FIG. 3, the second switch 17 can alternatively be arranged at a second position 18 which is arranged for example at a dashboard or centerstack of the host vehicle.

As illustrated in FIG. 3, the first switch 15 and/or the second switch 17 can also be arranged as lever-switches 15a, 17a arranged at the steering wheel 5. A vehicle operator can then activate the lever switches by pulling or pushing them in any direction.

In some embodiments the vehicle system 1 also comprises a switch activation determination unit 14 which is arranged to determine the amount of time one or more switches are activated by a vehicle operator. The switch activation determination unit 14 can be connected to the switches, the control arrangement 9 and/or the processing unit 12, and may comprise an appropriately programmed processor and associated memory, a timer, or other suitable device known in the art.

Figure 4:
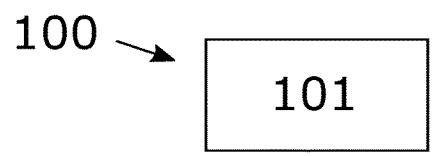
FIG. 4 illustrates a method for allowing transition from an autonomous driving mode to a second driving mode according to some embodiments.

FIG. 4 illustrates a method 100 for allowing transition from an autonomous driving mode AD to a second driving mode in a road vehicle having autonomous driving capabilities, and where the vehicle comprises a vehicle compartment, a steering wheel and at least one pedal.

The method 100 comprises: allowing 101, by a control arrangement, the transition when it is determined, by a first determination arrangement, that at least one pedal of the vehicle is depressed when the first switch and the second switch are simultaneously activated.

Figure 5:
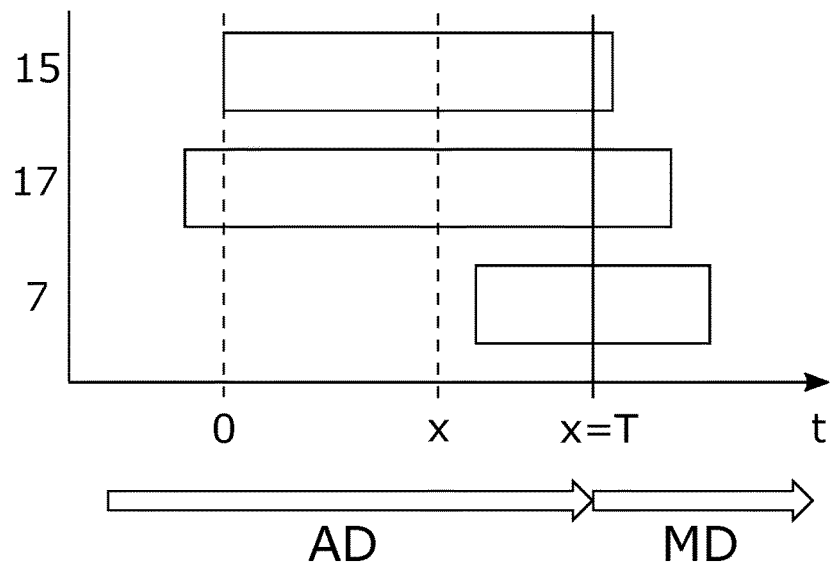
FIG. 5 illustrates transition between driving modes according to some embodiments.

FIG. 5 illustrates a scenario in which the host vehicle is in the autonomous driving mode AD and in which a vehicle operator intends to drive manually instead, i.e. initiate a transition from autonomous driving mode AD to manual driving mode MD. In order to do this he/she need to simultaneously activate the first switch 15 and the second switch 17 and depress a pedal 7. An activated switch or activated/depressed pedal is indicated by the boxes in the timelines of FIGS. 5 and 6. In the FIG. 5 embodiment the first switch 15 and the second switch 17 have to be simultaneously activated for at least a threshold amount T of time t. The time running from the moment both the first switch 15 and the second switch 17 are activated is denominated x. Thus, only when $x \geq T$ and the vehicle operator has depressed a pedal 7 the transition from the autonomous driving mode AD to the manual driving mode MD is allowed to occur.

As illustrated, the vehicle operator can activate one of the switches slightly before the other, but they have to be simultaneously activated for at least the threshold amount T of time t and at least one pedal has to be depressed for the transition from the autonomous driving mode AD to manual driving mode MD. Hereby it is ensured that the vehicle operator is aware of the transition.

In some embodiments the threshold time T is about 0.5 second. In some embodiments the threshold time T is about 1 second. In some embodiments the threshold time T is more than 1 second, such that 1.5, 2, 2.5 or 3 seconds. The vehicle system can be arranged to use any suitable threshold time T.

Figure 6:
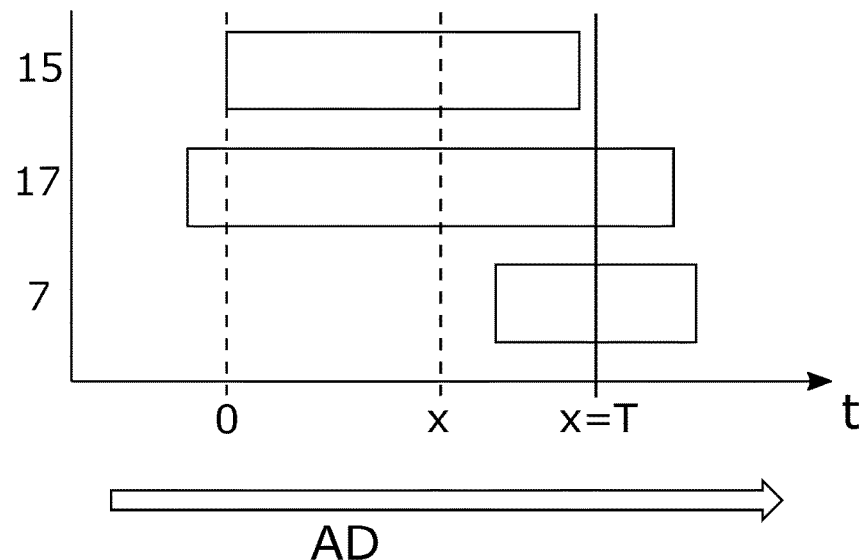
FIG. 6 illustrates a situation where no transition between driving modes occurs.

FIG. 6 illustrates a scenario in which the host vehicle is in the autonomous driving mode AD. The vehicle operator activates the first switch 15, the second switch 17 and depress the pedal 7, but as illustrated, he/she stops the activation of the first switch 15 too early, before and x=T. Hence, the first 15 and second 16 switches are not activated simultaneously long enough, i.e. x<T. Accordingly no transition from autonomous driving mode AD to a semi-autonomous driving mode SD or manual driving mode MD is allowed to occur.

The time the host vehicle is driven autonomously is indicated with an AD-arrow and the time the host vehicle is driven manually is indicated with an MD-arrow in FIGS. 5 and 6.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A vehicle system for allowing transition from an autonomous driving mode to a second driving mode in a road vehicle having autonomous driving capabilities and including a vehicle compartment, a steering wheel, and at least one pedal, the system comprising:
    a control arrangement;
    a first switch arranged at a first position at the steering wheel;
    a second switch arranged at a second position within the vehicle compartment, the second position being separate from the first position; and
    a first determination arrangement for determining if the at least one pedal is depressed;

wherein the control arrangement is configured to allow the transition only when it is determined that the at least one pedal of the vehicle is depressed when the first switch and the second switch are simultaneously activated.

2. The vehicle system according to claim 1 wherein the control arrangement comprises a switch activation determination unit and is configured to allow the transition when it is determined that the first switch and the second switch are simultaneously activated for at least a threshold amount of time.

3. The vehicle system according to claim 1 wherein the second driving mode is a semi-autonomous driving mode.

4. The vehicle system according to claim 1 wherein the second driving mode is a manual driving mode.

5. The vehicle system according to claim 1 wherein the first switch is arranged at a first half of a steering wheel circumference and the second switch is arranged at a second half of the steering wheel circumference.

6. The vehicle system according to claim 5 wherein the first switch and the second switch are arranged at a first side of the steering wheel, facing away from a steering column.

7. The vehicle system according to claim 5 wherein the first switch and the second switch are arranged at a second side of the steering wheel, facing a steering wheel column.

8. The vehicle system according to claim 1 wherein the first switch is a lever-switch arranged at the steering wheel.

9. The vehicle system according to claim 1 wherein both the first switch and the second switch are lever-switches arranged at the steering wheel.

10. A vehicle comprising a vehicle system according to claim 1.

11. A method for allowing transition from an autonomous driving mode to a second driving mode in a road vehicle having autonomous driving capabilities and including a vehicle compartment, a steering wheel, and at least one pedal, the method comprising:
allowing, by a control arrangement, the transition only when it is determined, by a first determination arrangement, that the at least one pedal of the vehicle is depressed when the first switch and the second switch are simultaneously activated.

12. The method of claim 11 further comprising determining if the at least one pedal is depressed.

13. The method of claim 11 further comprising determining that the first switch and the second switch are simultaneously activated for at least a threshold amount of time.

14. A vehicle system for allowing transition from an autonomous driving mode to a second driving mode in a road vehicle having autonomous driving capabilities and including a vehicle compartment, a steering wheel, and at least one pedal, the system comprising:
a control arrangement;
a first switch arrangable at a first position at the steering wheel;
a second switch arrangable at a second position within the vehicle compartment, the second position being separate from the first position; and
a first determination arrangement for determining if the at least one pedal is depressed;
wherein the control arrangement is configured to allow the transition only when it is determined that the at least one pedal of the vehicle is depressed when the first switch and the second switch are simultaneously activated.

15. The vehicle system according to claim 14 wherein the control arrangement comprises a switch activation determination unit and is configured to allow the transition when it is determined that the first switch and the second switch are simultaneously activated for at least a threshold amount of time.

16. The vehicle system according to claim 14 wherein the second driving mode is a semi-autonomous driving mode.

17. The vehicle system according to claim 14 wherein the second driving mode is a manual driving mode.

18. The vehicle system according to claim 14 wherein the first switch is arrangable at a first half of a steering wheel circumference and the second switch is arrangable at a second half of the steering wheel circumference.

19. The vehicle system according to claim 14 wherein the first switch is a lever-switch arrangable at the steering wheel.

20. The vehicle system according to claim 14 wherein both the first switch and the second switch are lever-switches arrangable at the steering wheel.

* * * * *